(12) United States Patent
Lai

(10) Patent No.: US 7,419,294 B2
(45) Date of Patent: Sep. 2, 2008

(54) NIGHT LAMP

(76) Inventor: Li-Chun Lai, 21F-1., No. 33, Sec. 1 Minsheng Rd., Panciao City, Taipei County (TW)

( * ) Notice: Subject to any disclaimer, the term of this patent is extended or adjusted under 35 U.S.C. 154(b) by 48 days.

(21) Appl. No.: 11/567,316

(22) Filed: Dec. 6, 2006

(65) Prior Publication Data
US 2008/0137378 A1 Jun. 12, 2008

(51) Int. Cl.
H01R 33/00 (2006.01)
(52) U.S. Cl. .................. 362/641; 362/644; 362/606; 362/619
(58) Field of Classification Search ............. 362/95, 362/806, 641, 642, 643, 644, 235, 249, 252, 362/308, 309, 326, 327, 329, 330, 332, 333, 362/334, 335, 336
See application file for complete search history.

(56) References Cited
U.S. PATENT DOCUMENTS
3,706,004 A * 12/1972 Schwartz .................. 315/71

2003/0147243 A1* 8/2003 Alduby ..................... 362/311
2006/0007709 A1* 1/2006 Yuen ........................ 362/641
2006/0164823 A1* 7/2006 Jao .......................... 362/101
2006/0209569 A1* 9/2006 Yuen ........................ 362/641
2007/0076440 A1* 4/2007 Chien ....................... 362/643

* cited by examiner

Primary Examiner—Thomas M Sember

(57) ABSTRACT

A night lamp includes a main body and a light distribution unit, which allows the passage of light and is fitted onto the main body. The thickness of the light distribution unit gradually increases from the bottom to the top. The light distribution unit has an arcuate front surface. A sunken design is provided in the front surface of the light distribution unit and the thickness of the sunken design gradually increases from the bottom to the top. A plurality of light refractive pieces are provided on the front surface and periphery of the sunken design. When light is generated by the light generating units, light may be evenly distributed in the light distribution unit and hence the light distribution unit may deliver evenly distributed light so that light may reach a broader range.

14 Claims, 4 Drawing Sheets

NIGHT LAMP

BACKGROUND OF THE INVENTION

1. Field of the iIvention

The invention generally relates to an improved night lamp. More particularly, the invention relates to an improved night lamp in which light may be evenly distributed in the light distribution unit.

2. Description of the Prior Art

Night lamps are used in the indoor (such as bedrooms, pathways, stairways, etc.) so that people can see their surroundings so as to ensure safety. Traditionally, incandescent bulb is used as the light generating source for night lamps. However, incandescent bulb has many disadvantages: (1) Not energy efficient (2) Having a relatively shorter service life (3) A lot of heat is generated when it is lit and this may inflict bodily injuries when a user accidentally touches it and may even cause fires when an combustible object has contact with it. Therefore, the use of incandescent bulb as the light source for night lamps is not economical and not very safe.

To do away with the disadvantages of incandescent bulb, LED has been used as the light source for night lamps. In such lamp, a light distribution unit is used so that light generated by LED may be projected onto the light distribution unit. However, most of the light is usually concentrated in the bottom portion of the light distribution unit and this may reduce the intensity and illumination range of the lamp.

From the above, we can see that the prior art night lamps have many disadvantages and need to be improved.

To eliminate the disadvantages of the prior art night lamps, the inventor has put in a lot of effort in the subject and has successfully come up with the improved night lamp of the present invention.

SUMMARY OF THE INVENTION

The present invention is to provide an improved night lamp in which the thickness of the light distribution unit gradually increases from the bottom to the top so that light may be spread out to a larger area.

Another, the present invention is to provide an improved night lamp in which the thickness of a sunken design provided in the front surface of the light distribution unit gradually increases from the bottom to the top and a plurality of light refractive pieces are provided on the sunken design so that the light distribution unit may deliver evenly distributed light.

Third, the present invention is to provide an improved night lamp that is structurally simple, easy to assemble and highly useful.

The improved night lamp of the present invention comprises a main body and a light distribution unit. One or more light generating units are disposed in the main body. The thickness of the light distribution unit gradually increases from the bottom to the top. A sunken design is provided in the front surface of the light distribution unit and the thickness of the sunken design gradually increases from the bottom to the top. A plurality of light refractive pieces are provided on the front surface of the sunken design. A layer of light reflective material is coated on the rear wall of the light distribution unit. The light distribution unit is fitted onto the main body so that the bottom of the light distribution unit is near the light generating units. With the shape of the light distribution unit (i.e., the thickness of the light distribution unit gradually increases from the bottom to the top), the arcuate surface of sunken design, the light refractive pieces (which may reflect the light) and the layer of light reflective material, when light is generated by the light generating units, light may be evenly distributed in the light distribution unit and hence the light distribution unit may deliver evenly distributed light.

These features and advantages of the present invention will be fully understood and appreciated from the following detailed description of the accompanying Drawings.

DETAILED DESCRIPTION OF THE PREFERRED EMBODIMENT

Figure 1:
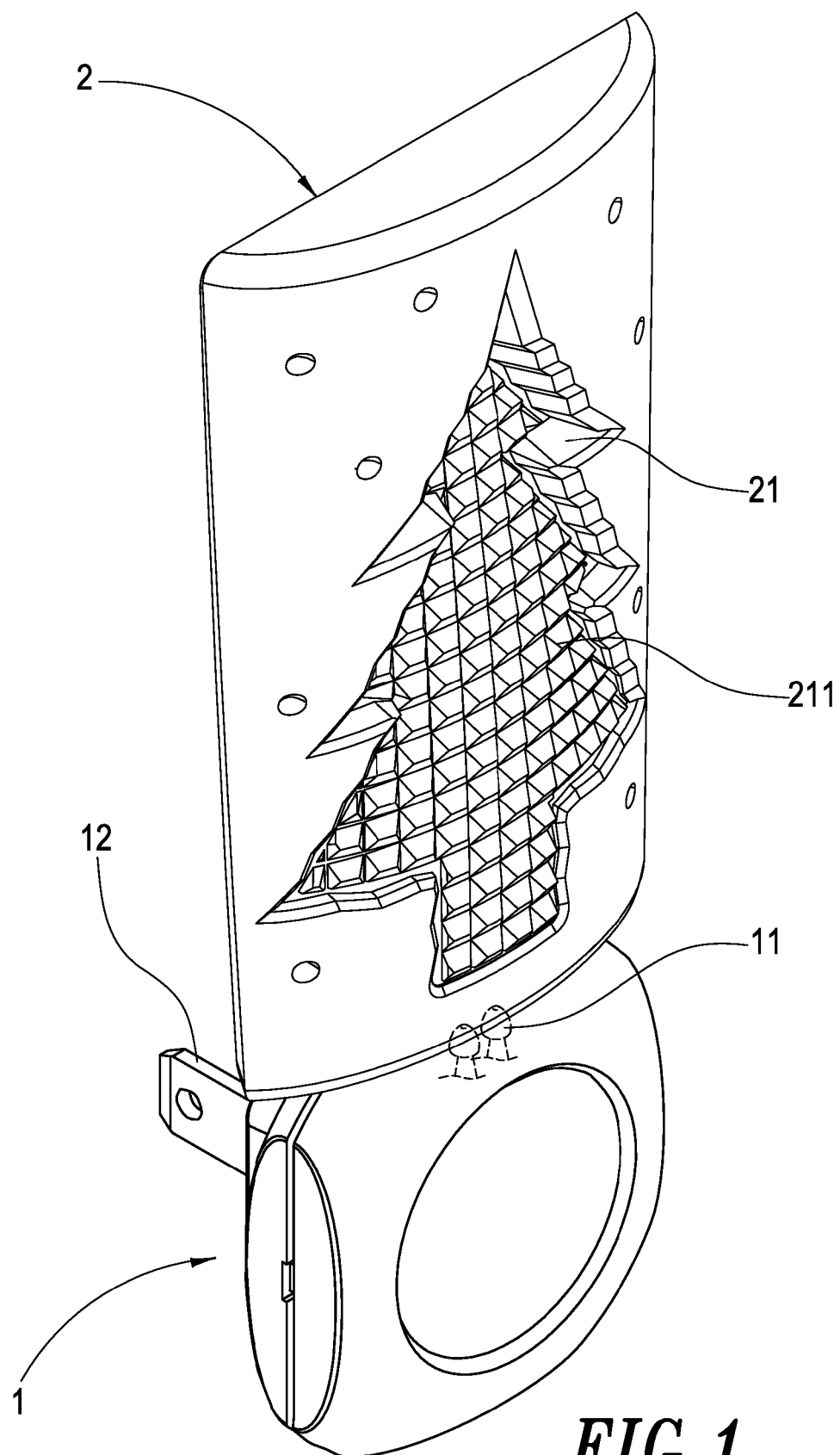
FIG. 1 is a front perspective view of the improved night lamp of the present invention.
Figure 2:
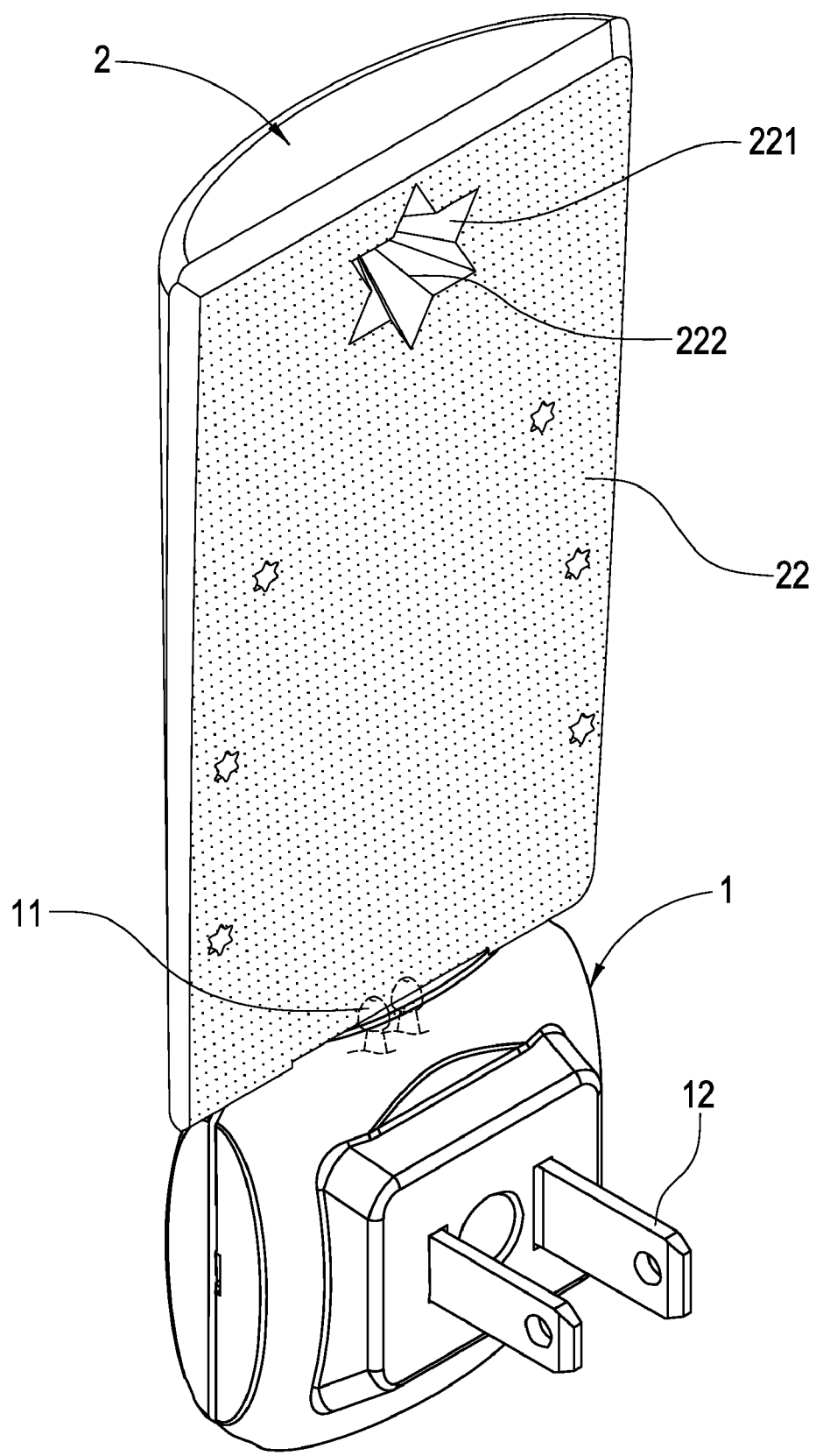
FIG. 2 is a rear perspective view of the improved night lamp of the present invention.
Figure 3:
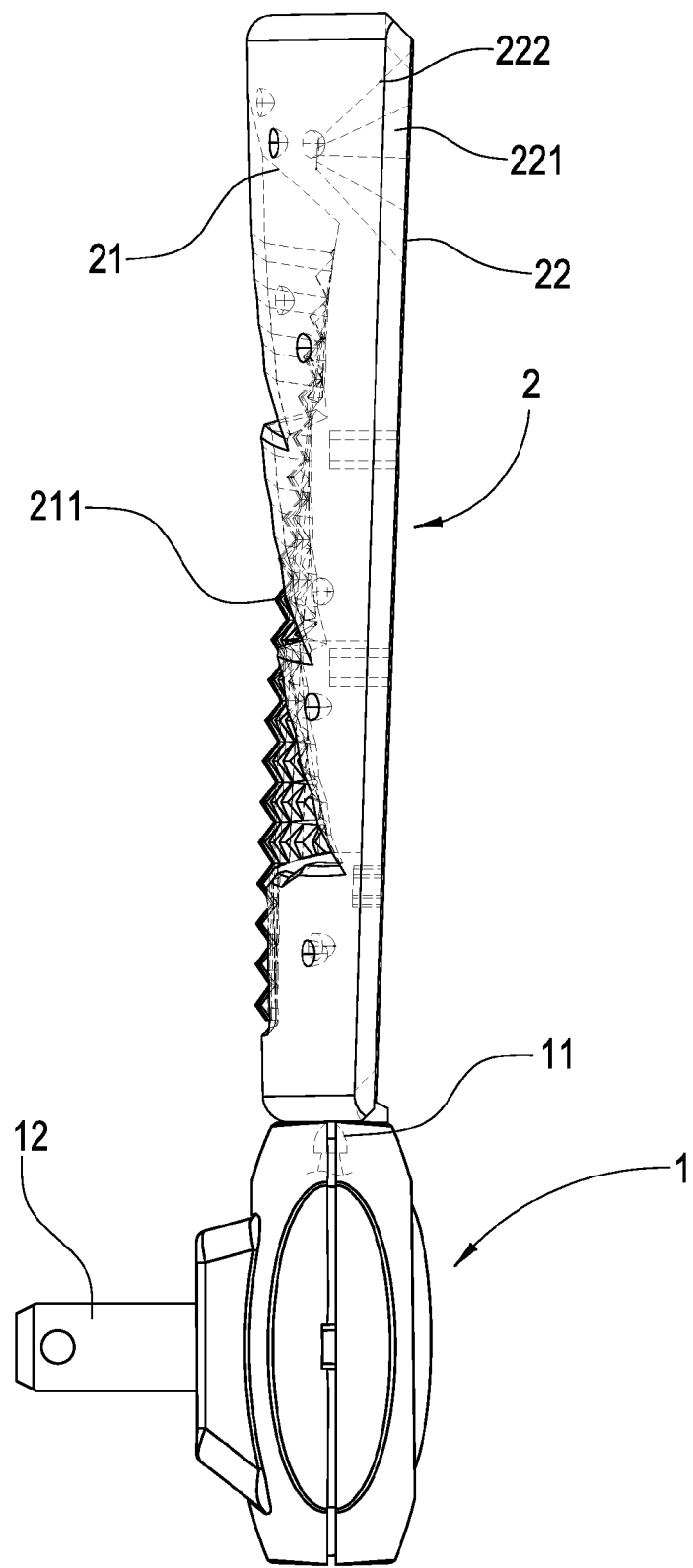
FIG. 3 is a side view of the improved night lamp of the present invention.

Please see FIGS. 1, 2 and 3. The improved night lamp of the present invention comprises a main body 1 and a light distribution unit 2.

A notch (not shown in the drawings) is provided on the top surface of the main body 1. One or more light generating units 11 are disposed in the notch. Two conductive prongs extend from the rear wall of the main body 1. The two electrically conductive prongs are electrically connected with the light generating units 11 so that electricity may be fed to the light generating units 11 and that the light generating units 11 may be lit.

The thickness of the light distribution unit 2 gradually increases from the bottom to the top. The light distribution unit 2 has a flat rear surface and an arcuate front surface. A sunken design 21 is provided in the front surface of the light distribution unit 2. The thickness of the sunken design 21 gradually increases from the bottom to the top. The sunken design 21 has an arcuate surface. A plurality of light refractive pieces 211 are provided on the front surface and periphery of the sunken design 21. A layer 22 of light reflective material is coated on the rear wall of the light distribution unit 2. Another sunken design 221 is provided in the rear surface of the light distribution unit 2. A plurality of light refractive pieces 222 are provided on the periphery of the sunken design 221.

The light distribution unit 2 is fitted onto the main body 1 through a notch provided on the top surface of the main body so that the bottom of the light distribution unit 2 is near the light generating units 11.

Figure 4:
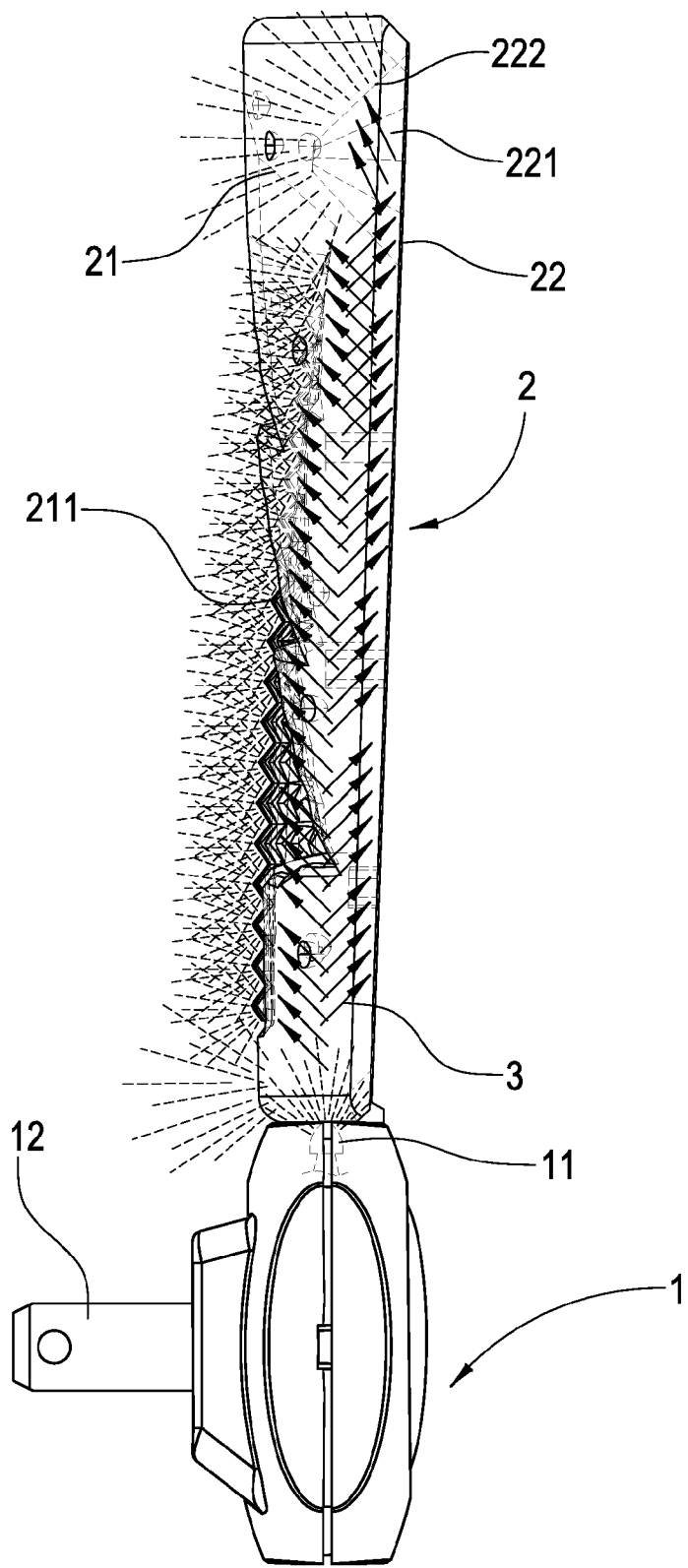
FIG. 4 is a side view showing the improved night lamp of the present invention in operation.

Now, please see FIG. 4, which shows the improved night lamp of the present invention in operation. With the shape of the light distribution unit 2 (i.e., the thickness of the light distribution unit 2 gradually increases from the bottom to the top), the arcuate surface of sunken design 21, the light refractive pieces 211 (which may refract the light) and the layer 22 of light reflective material, when light is generated by the light generating units 11, light may be evenly distributed in the light distribution unit 2 and hence the light distribution unit 2 may deliver evenly distributed light so that light may reach a broader range.

In comparison to the prior art night lamps, the improved night lamp of the present invention has the following three advantages:

1. In the improved night lamp of the present invention, the thickness of the light distribution unit gradually increases from the bottom to the top so that light may be spread out to a larger area.

2. In the improved night lamp of the present invention, the thickness of the sunken design provided in the front surface of the light distribution unit gradually increases from the bottom to the top. Also, a plurality of light refractive pieces are provided on the sunken design. Therefore, the light distribution unit may deliver evenly distributed light.

3. The improved night lamp of the present invention is structurally simple, easy to assemble and highly useful.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A night lamp, comprising:
   a main body, wherein one or more light generating units are disposed in a top surface of the main body and two conductive prongs extend from a rear wall of the main body so that electricity is fed to the light generating units and that the light generating units is lit; and
   a light distribution unit, wherein a sunken design is provided in a front surface of the light distribution unit and the thickness of the sunken design gradually increases from a bottom to a top so that the sunken design has an arcuate surface and wherein a plurality of light refractive pieces are provided on the front surface and periphery of the sunken design,
   thereby the light distribution unit is fitted onto the main body so that a bottom of the light distribution unit is near the light generating units.

2. The night lamp as in claim 1, wherein a notch is provided on the top surface of the main body so that the light distribution unit may be fitted onto the main body.

3. The night lamp as in claim 1, wherein the thickness of the light distribution unit gradually increases from the bottom to the top.

4. The night lamp as in claim 1, wherein the sunken design may be provided in the front surface or the rear surface of the light distribution unit.

5. The night lamp as in claim 1, wherein the sunken design may be provided in the front surface and the rear surface of the light distribution unit.

6. A night lamp, comprising:
   a main body, wherein one or more light generating units are disposed in a top surface of the main body and two conductive prongs extend from a rear wall of the main body so that electricity is fed to the light generating units and that the light generating units is lit; and
   a light distribution unit, having a flat rear surface and an arcuate front surface, wherein a sunken design is provided in the front surface of the light distribution unit and the thickness of the sunken design gradually increases from a bottom to a top so that the sunken design has an arcuate surface and wherein a plurality of light refractive pieces are provided on the front surface and periphery of the sunken design,
   thereby the light distribution unit is fitted onto the main body so that a bottom of the light distribution unit is near the light generating units.

7. The night lamp as in claim 6, wherein a notch is provided on the top surface of the main body so that the light distribution unit may be fitted onto the main body.

8. The night lamp as in claim 6, wherein the thickness of the light distribution unit gradually increases from the bottom to the top.

9. The night lamp as in claim 6, wherein the sunken design may be provided in the front surface or/and the rear surface of the light distribution unit.

10. A night lamp, comprising:
    a main body, wherein one or more light generating units are disposed in a top surface of the main body and two conductive prongs extend from a rear wall of the main body so that electricity is fed to the light generating units and that the light generating units is lit; and
    a light distribution unit, having a flat rear surface and an arcuate front surface, wherein a layer of light reflective material is coated on a rear wall of the light distribution unit, and wherein a sunken design is provided in a front surface of the light distribution unit and the thickness of the sunken design gradually increases from a bottom to a top so that the sunken design has an arcuate surface, and wherein a plurality of light refractive pieces are provided on a front surface and periphery of the sunken design,
    thereby the light distribution unit is fitted onto the main body so that a bottom of the light distribution unit is near the light generating units.

11. The night lamp as in claim 10, wherein a notch is provided on the top surface of the main body so that the light distribution unit may be fitted onto the main body.

12. The night lamp as in claim 10, wherein the thickness of the light distribution unit gradually increases from the bottom to the top.

13. The night lamp as in claim 10, wherein the sunken design may be provided in the front surface or the rear surface of the light distribution unit.

14. The night lamp as in claim 10, wherein the sunken design may be provided in the front surface and the rear surface of the light distribution unit.

* * * * *